(12) United States Patent
Kim (10) Patent No.: US 11,577,640 B2
(45) Date of Patent: Feb. 14, 2023

(54) VEHICLE LAMP MODULE AND VEHICLE INCLUDING THE SAME HAVING A BEAM FORMING PART ROTOTABLY COUPLED TO A SENSOR PART

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/487,119

(22) Filed: Sep. 28, 2021

(65) Prior Publication Data
US 2022/0097599 A1    Mar. 31, 2022

(30) Foreign Application Priority Data

Sep. 28, 2020 (KR) .................. 10-2020-0126061
Nov. 6, 2020 (KR) .................. 10-2020-0147961

(51) Int. Cl.
*B60Q 1/115*    (2006.01)
*B60Q 1/076*    (2006.01)
*F21S 41/657*   (2018.01)

(52) U.S. Cl.
CPC .............. *B60Q 1/115* (2013.01); *B60Q 1/076* (2013.01); *F21S 41/657* (2018.01); *B60Q 2300/114* (2013.01)

(58) Field of Classification Search
CPC ...... B60Q 1/0023; B60Q 1/249; B60Q 1/115; B60Q 1/076
See application file for complete search history.

(56) References Cited

U.S. PATENT DOCUMENTS 10,730,429 B2 * 8/2020 Hori .................... B60Q 1/0023

\* cited by examiner

*Primary Examiner* — Robert J May
(74) *Attorney, Agent, or Firm* — NovoTechIP International PLLC (57) ABSTRACT

A vehicle lamp module and a vehicle including the vehicle lamp module are provided. The vehicle lamp module includes a beam pattern forming part to form a beam pattern of light irradiated externally from a vehicle, a sensor part provided at one side of the beam pattern forming part to sense an external region including the beam pattern, a driving part coupled to one side of the sensor part to provide a driving force for rotating the sensor part to change the external region that the sensor part faces, and a connection part interposed between the beam pattern forming part and the sensor part to selectively connect or disconnect the beam pattern forming part and the sensor part with or from each other.

20 Claims, 11 Drawing Sheets

VEHICLE LAMP MODULE AND VEHICLE INCLUDING THE SAME HAVING A BEAM FORMING PART ROTOTABLY COUPLED TO A SENSOR PART

CROSS-REFERENCE TO RELATED APPLICATIONS

This application claims the benefit of priority to Korean Patent Application Nos. 10-2020-0126061 and 10-2020-0147961, filed in the Korean Intellectual Property Office on Sep. 28, 2020 and Nov. 6, 2020, respectively, the entire contents of which are incorporated herein by reference.

BACKGROUND OF THE INVENTION

1. Field of the Invention

The present disclosure relates to a vehicle lamp module and a vehicle including the same, and more particularly to a vehicle lamp module including a sensor and a vehicle including the same.

2. Discussion of Related Art

An auto leveling system refers to a system to automatically adjust the direction of a head lamp depending on a position change of a vehicle, especially, a position change of the vehicle in a front-rear direction. The auto leveling system allows the head lamp to face a specific direction, when the vehicle is traveling uphill or downhill, or when the center of gravity is changed in the front-rear direction of the vehicle, due to the mounting of an object on the vehicle, Meanwhile, recently, various sensors have been mounted in the vehicle to perform autonomous driving or to assist the driving by a driver. The sensors may include a camera, a LIDAR sensor, or a RADAR sensor According to the related art, although the direction of the head lamp is automatically adjusted depending on the position change of the vehicle by the auto leveling system, the directions of the sensors are not automatically adjusted depending on the position change of the vehicle. Accordingly, the sensitivity of the sensors may be remarkably degraded due to the position change of the vehicle, especially, the position change of the vehicle in the front-rear direction.

BRIEF SUMMARY OF THE INVENTION

The present disclosure has been made to solve the above-mentioned problems occurring in the prior art while advantages achieved by the prior art are maintained intact.

An aspect of the present disclosure provides a vehicle lamp module having a structure to automatically adjust even the direction of a sensor, as well as the direction of a vehicle lamp, depending on the position change of a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle lamp module includes a beam pattern forming part to form a beam pattern by irradiating light to an outside, a sensor part provided at one side of the beam pattern forming part to sense an external region including the beam pattern, a driving part coupled to one side of the sensor part to provide driving force for rotating the sensor part to change an external region that the sensor part faces, and a connection part interposed between the beam pattern forming part and the sensor part to selectively connect or disconnect the beam pattern forming part and the sensor part with or from each other. When the beam pattern forming part is connected with the sensor part by the connection part, the beam pattern forming part is rotated together with the sensor part, as the sensor part performs a rotation movement by the driving part When the sensor part is rotated in an up-down direction by the driving part, and when the beam pattern forming part is connected with the sensor part by the connection part, the beam pattern forming part is rotated together the sensor part in the up-down direction, as the sensor part performs the rotation movement by the driving part.

The sensor part may be provided at one side of the beam pattern forming part in a left-right direction, and the driving part may be provided at one side of the sensor part in the up-down direction.

The driving part may be provided under the sensor part.

The connection part may include a first connection member coupled to one side of the beam pattern forming part, and a second connection member coupled to one side of the sensor part. The connection part may selectively connect or disconnect the beam pattern forming part with or from the sensor part, as the first connection member and the second connection member are coupled to each other or separated from each other due to the relative movement between the first connection member and the second connection member in the left-right direction.

The first connection member may further include a rod structure provided to be movable in the left-right direction. When the rod structure moves in the left-right direction to be inserted into the second connection member, the connection part connects the beam pattern forming part with the sensor part. When the rod structure moves in the left-right direction to be separated from the second connection member, the connection part may disconnect the beam pattern forming part from the sensor part.

The second connection member may further include a support structure provided at a rear portion of the sensor part, having a shape of a plate extending in the front-rear direction, and having a hole formed in a region facing the rod structure. In this case, when the rod structure moves in the left-right direction to be inserted into the hole formed in the support structure, the connection part connects the beam pattern forming part with the sensor part. When the rod structure moves in the left-right direction to be separated from the hole, the connection part may disconnect the beam pattern forming part from the sensor part.

A plurality of rod structures and a plurality of holes may be provided.

A plurality of rod structures and a plurality of holes may be provided in an up-down direction.

According to another aspect of the present disclosure, a vehicle lamp module includes a beam pattern forming part to form a beam pattern by irradiating light to an outside, a sensor part provided at one side of the beam pattern forming part to sense an external region including the beam pattern, a driving part coupled to one side of the sensor part to provide driving force for rotating the sensor part to change an external region that the sensor part faces, and a connection part interposed between the beam pattern forming part and the sensor part to connect the beam pattern forming part and the sensor part with each other. The connection part includes a first base structure fixed at one side of the sensor part and a second base structure coupled to one side of the first base structure, and the first base structure and the second base structure are coupled to each other to be rotatable relatively to each other.

The first base structure and the second base structure may be coupled to each other to be rotatable in the left-right direction.

The connection part may further include a third base structure fixed to one side of the beam pattern forming part, and the second base structure and the third base structure may be coupled to each other to be rotatable relatively to each other.

The second base structure and the third base structure may be coupled to each other to be rotatable relatively to each other in the up-down direction.

The first base structure may include a first plate member having the shape of a plate extending in a horizontal direction from the sensor part. The second base structure may include a second plate member having the shape of a plate provided to face the first plate member and extending in the horizontal direction. The first plate member and the second plate member may be coupled to each other by a bolt member extending in the up-down direction The third base structure may have the shape of a plate extending in the up-down direction. The second base structure may include a third plate member provided to face the third base structure and extending in the up-down direction. The third base structure and the third plate member may be coupled to each other a bolt member extending in the left-right direction.

At least one first protruding part may be provided in the form of protruding from a rear surface of the first plate member, and at least one first recess part may be provided in a region, which faces the first protruding part of the second plate member.

One first protruding part may be provided, and a plurality of first recess parts may be provided.

At least one first groove part may be provided in a front surface of the third base structure, and at least one second protruding part may be provided, in the form of protruding toward the first groove part, in a region, which faces the first groove part of the third plate member.

A plurality of first groove parts may be provided, and one second protruding part may be provided.

According to another aspect of the present disclosure, a vehicle including the vehicle lamp module is provided, and the vehicle lamp module is provided at a front portion of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE INVENTION

Hereinafter, a vehicle lamp module and a vehicle according to the present disclosure will be described with reference to accompanying drawings.

Vehicle Lamp Module

Figure 1:
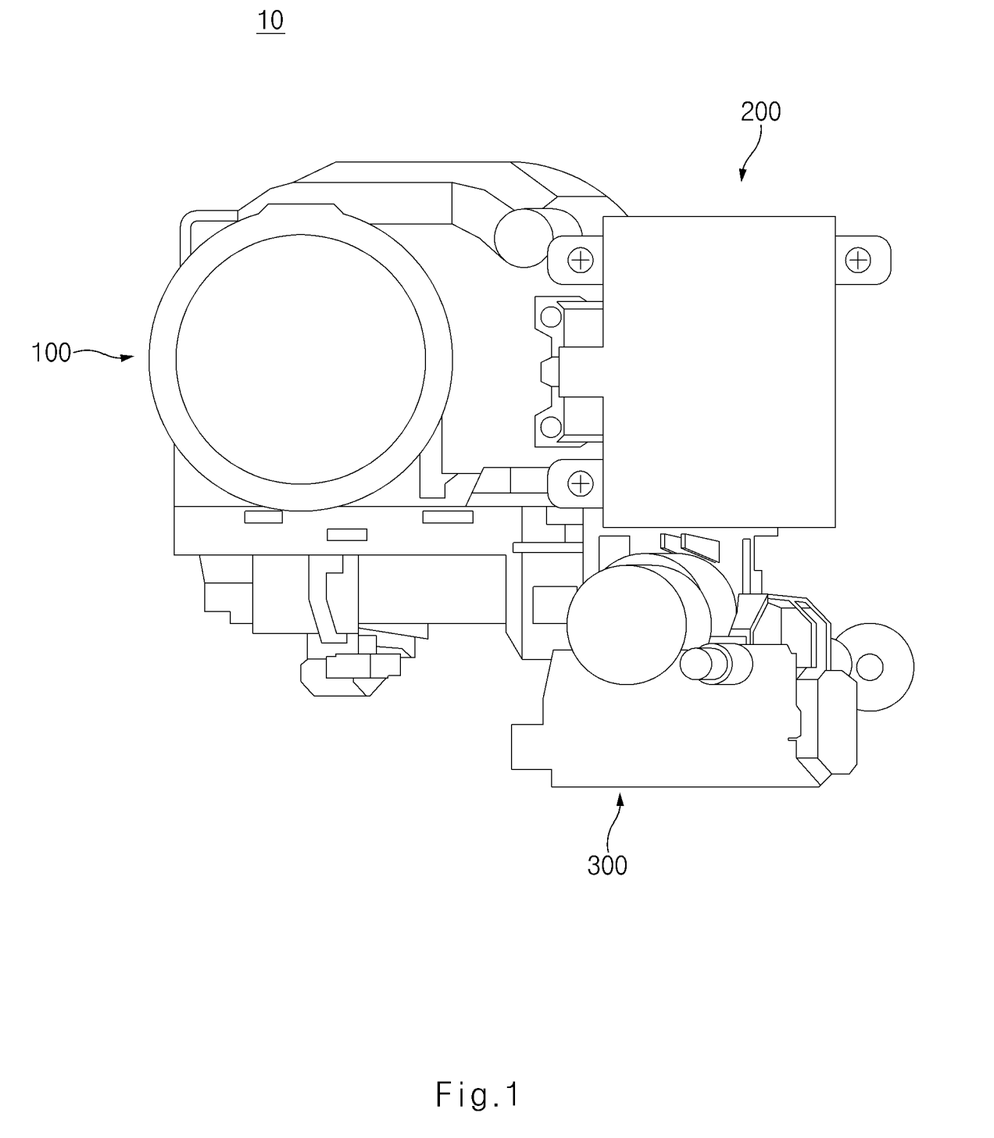
FIG. 1 is a front view illustrating the structure of a vehicle lamp module, according to an embodiment of the present disclosure.
Figure 2:
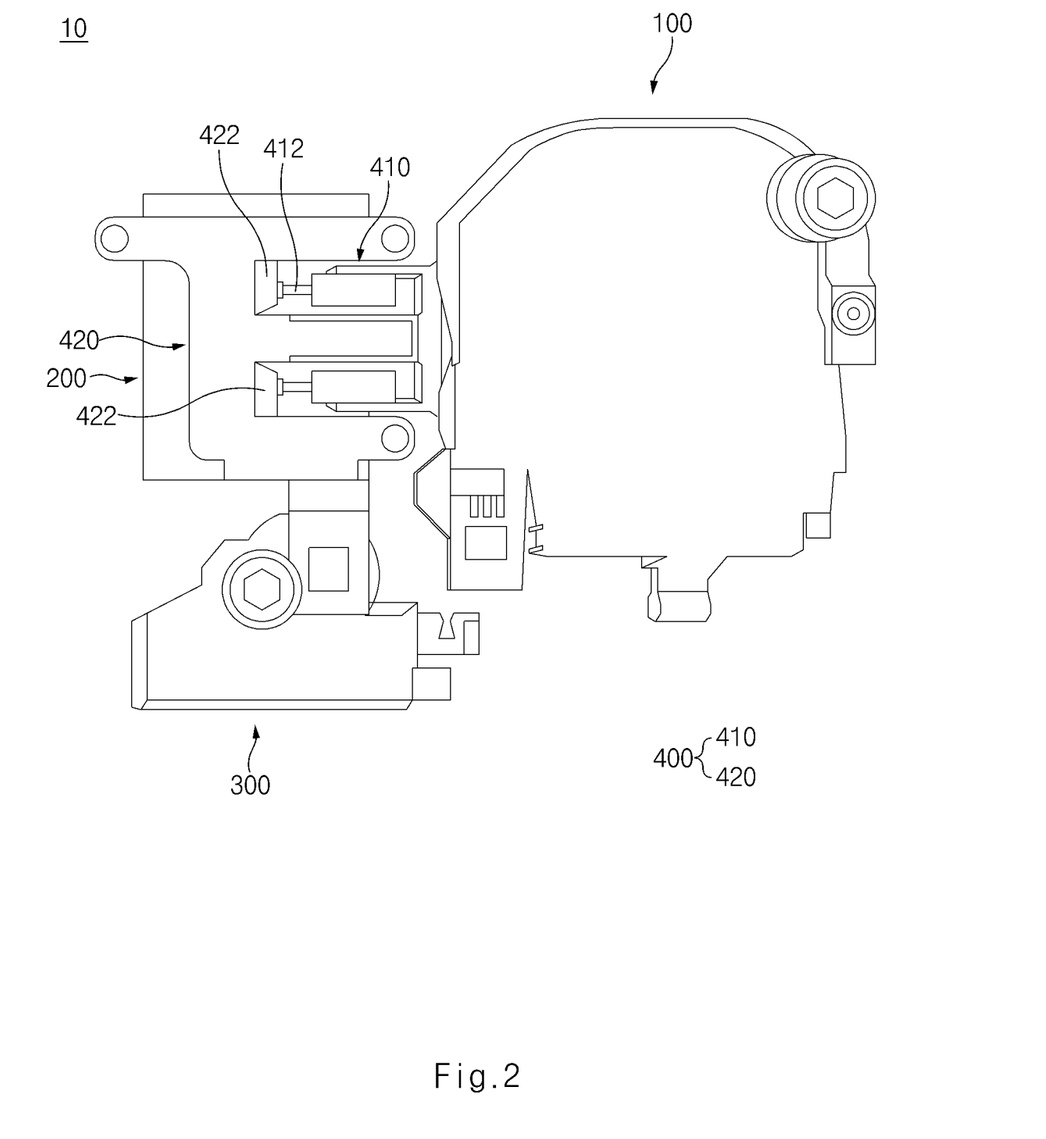
FIG. 2 is a rear view illustrating the structure of a vehicle lamp module, according to an embodiment of the present disclosure.

FIG. 1 is a front view illustrating the structure of a vehicle lamp module, according to an embodiment of the present disclosure, and FIG. 2 is a rear view illustrating the structure of a vehicle lamp module, according to an embodiment of the present disclosure.

As illustrated in FIGS. 1 and 2, according to the present disclosure, a vehicle lamp module 10 (hereinafter, a "lamp module" or a "head lamp") may include a beam pattern forming part 100 to form a beam pattern by irradiating light to the outside. The beam pattern forming part 100 may, for example, form the pattern of a beam, such as a high beam or a low beam, for a head lamp. However, the beam pattern forming part 100 is not limited thereto, but may form various types of beam patterns irradiated by the vehicle. To this end, the beam pattern forming part 100 may include a light source, such as a light emitting diode (LED), and a lens to output the light irradiated by the light source.

Meanwhile, the lamp module 10 may further include a sensor part 200 that is provided at one side of the beam pattern forming part 100, and senses an external region including the beam pattern. For example, when the lamp module 10 is viewed from the front, as illustrated in FIG. 1, the sensor part 200 may be provided at one side of the beam pattern forming part 100 in a left-right or lateral direction. The sensor part 200 may be, for example, a radio detection and ranging (RADAR) sensor. However, the sensor part 200 may be a light detection and ranging (LIDAR) sensor or a camera.

Referring back to FIG. 1, according to the present disclosure, the lamp module 10 may include a driving part 300 coupled to one side of the sensor part 200 to provide driving force for rotating the sensor part 200 such that an external region that the sensor part 200 faces is changed. The driving part 300 may be provided at the one side of the sensor part 200 in an up-down over vertical direction. FIG. 1 illustrates that the driving part 300 is provided under the sensor part 200. More preferably, the sensor part 200 may perform a rotation movement in the up-down direction or vertical by the driving part 300.

The driving part 300 may be a component corresponding to an auto leveling system according to the related art. In this case, the auto leveling system according to the related art controls only the rotation movement of a component, which is a beam pattern forming part, to form a beam pattern, but the driving part 300 according to the present disclosure may be a component to control the rotation movement of the sensor part 200 as well as the rotation movement of the beam pattern forming part 100. The driving part 300 may include a length-variable member 310 (see FIGS. 3 and 4) having the shape of a rod and coupled to a lower portion of the sensor part 200, and the length of the length-variable member 310 is adjustable in the front-rear direction. In more detail, as the length of the length-variable member 310 is changed, the rotation movement of the sensor part 200 may be controlled, or the rotation movements of the beam pattern forming part 100 and the sensor part 200 may be controlled together.

Meanwhile, as illustrated in FIG. 2, the lamp module 10 may further include a connection part 400 interposed between the beam pattern forming part 100 and the sensor part 200 to selectively connect or disconnect the beam pattern forming part 100 with or from the sensor part 200.

Figure 3:
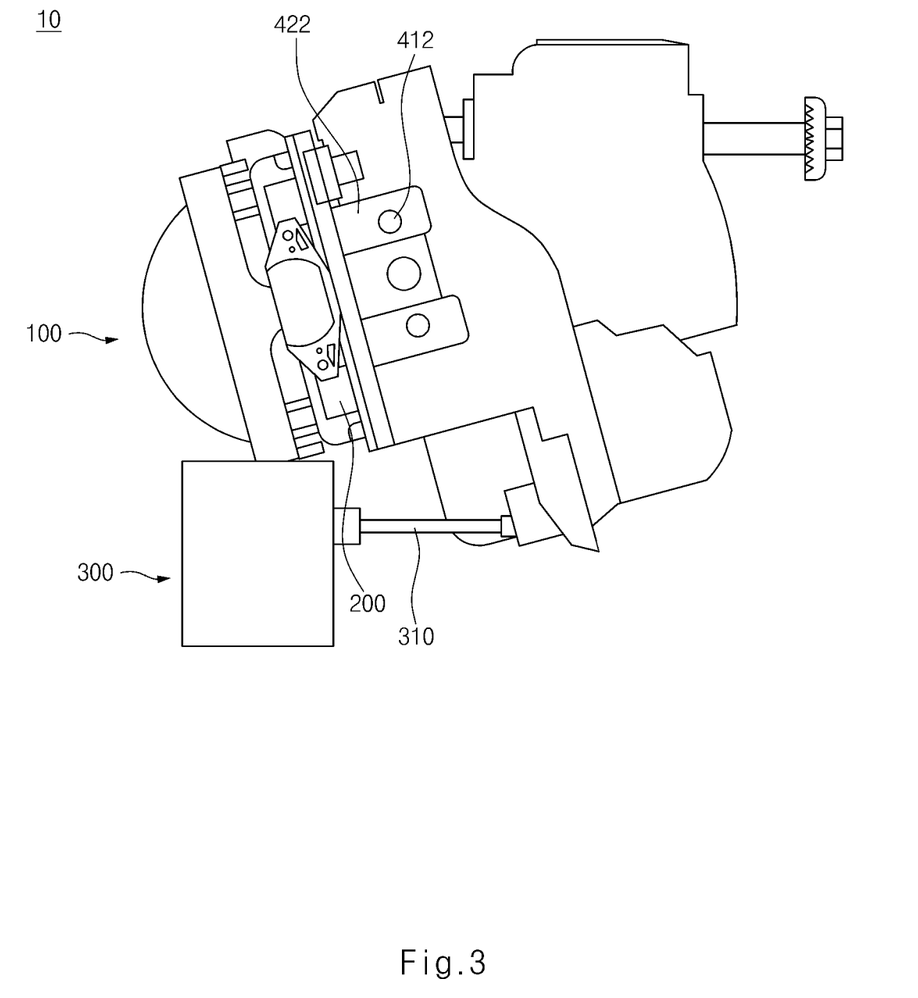
FIG. 3 is a side view illustrating a vehicle lamp module in which a beam pattern forming part and a sensor part are rotated together by a driving part, according to an embodiment of the present disclosure.
Figure 4:
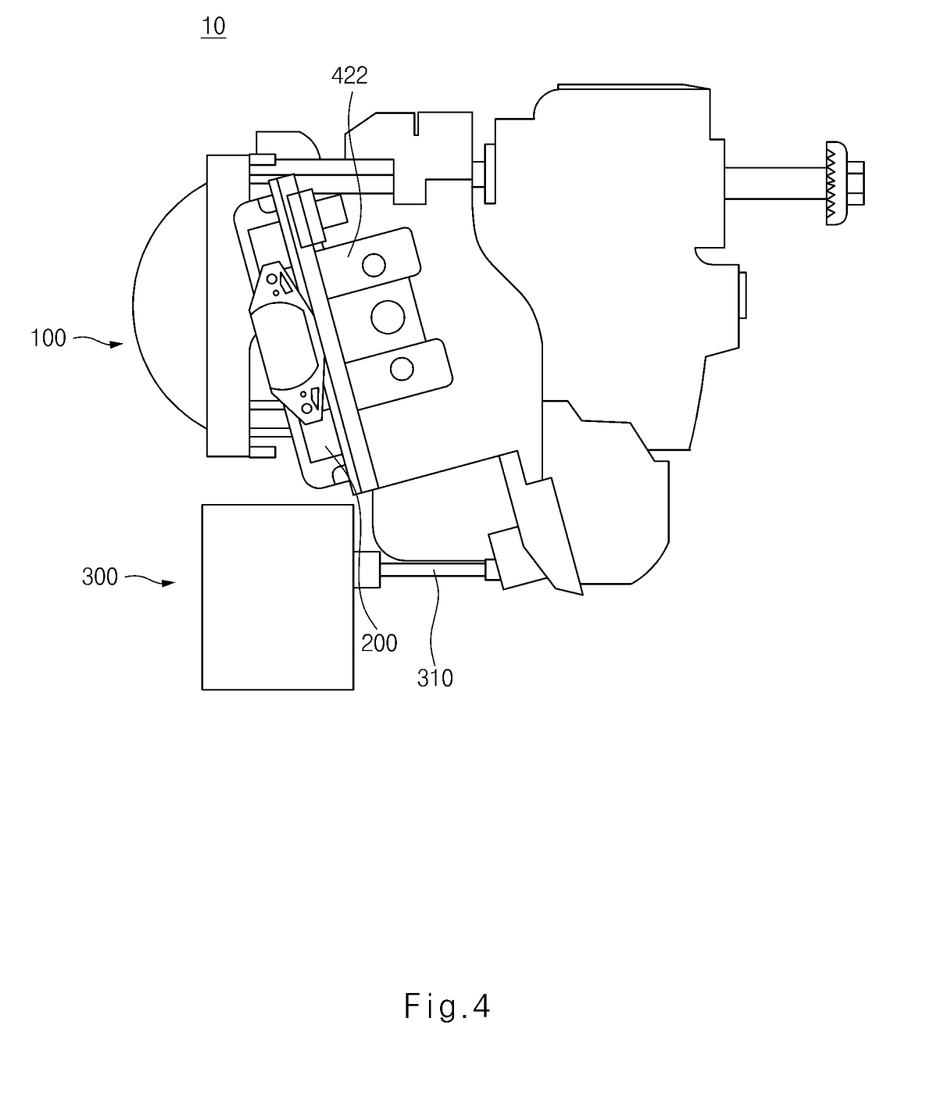
FIG. 4 is a side view illustrating a vehicle lamp module in which only a sensor part is rotated by a driving part, according to an embodiment of the present disclosure.

FIG. 3 is a side view illustrating a vehicle lamp module in which a beam pattern forming part and a sensor part are rotated together by a driving part, according to an embodiment of the present disclosure, and FIG. 4 is a side view illustrating a vehicle lamp module in which only a sensor part is rotated by a driving part, according to an embodiment of the present disclosure.

As described above, according to the present disclosure, the connection part 400 is provided in the lamp module 10 to selectively connect or disconnect the beam pattern forming part 100 with or from the sensor part 200. For example, when the beam pattern forming part 100 is connected with the sensor part 200 through the connection part 400, as the sensor part 200 is rotated by adjusting the length of the length-variable member 310 provided in the driving part 300, the beam pattern forming part 100 may be rotated together with the sensor part 200 in the up-down or vertical direction, as illustrated in FIG. 3. As illustrated in FIG. 3, as the length of the length-variable member 310 is increased, the beam pattern forming part 100 and the sensor part 200 are rotated downward.

Meanwhile, when the beam pattern forming part 100 is disconnected from the sensor part 200 through the connection part 400, only the sensor part 200 is rotated by adjusting the length of the length-variable member 310 provided in the driving part 300, as illustrated in FIG. 4. As illustrated in FIG. 4, as the length of the length-variable member 310 is increased, only the sensor part 200 is rotated downward. Hereinafter, the detailed structure of the connection part 400 will be described.

As illustrated in FIGS. 1 to 4, according to an embodiment of the present disclosure, the connection part 400 may include a first connection member 410 coupled to one side of the beam pattern forming part 100. More preferably, at least a portion of the first connection member 410 may be fixed such that at least the portion of the first connection member 410 is prevented from moving relatively to the beam pattern forming part 100.

In addition, the connection part 400 may further include a second connection member 420 coupled to one side of the sensor part 200. More preferably, the second connection member 420 may be fixed to be prevented from moving relatively to the sensor part 200. As illustrated in FIGS. 1 to 4, the second connection member 420 is fixed to a rear surface of the sensor part 200.

Meanwhile, according to an embodiment of the present disclosure, the connection part 400 may selectively connect or disconnect the beam pattern forming part 100 with or from the sensor part 200, as the first connection member 410 and the second connection member 420 are coupled to each other or separated from each other due to the relative movement between the first connection member 410 and the second connection member 420 in the left-right or lateral direction.

In more detail, as illustrated in FIG. 2, the first connection member 410 may further include a rod structure 412 provided to be movable in the left-right or lateral direction. Accordingly, when the rod structure 412 moves in the left-right or lateral direction to be inserted into the second connection member 420, the beam pattern forming part 100 and the sensor part 200 may be connected with each other through the connection part 400. To the contrary, when the rod structure 412 moves in the left-right or lateral direction to be separated from the second connection member 420, the beam pattern forming part 100 and the sensor part 200 may be disconnected from each other through the connection part 400.

Meanwhile, referring back to FIG. 2, the second connection member 420 may further include a support structure 422 provided at a rear portion of the sensor part 200, having a shape of the shape of a plate extending in the front-rear direction, and having a hole formed in a region facing the rod structure 412. In this case, when the rod structure 412 moves in the left-right or lateral direction to be inserted into the hole formed in the support structure 422, the beam pattern forming part 100 may be connected with the sensor part 200. To the contrary, when the rod structure 412 moves in the left-right or lateral direction to be separated from the hole formed in the support structure 422, the beam pattern forming part 100 may be disconnected from the sensor part 200.

Meanwhile, according to the present disclosure, the rod structure 412 and the hole formed in the support structure 422 may be provided in plural. For example, a plurality of rod structures 412 and a plurality of holes may be provided in the up-down or vertical direction. As illustrated in FIG. 2, two rod structures 412 and two holes are provided in the up-down or vertical direction.

Figure 5:
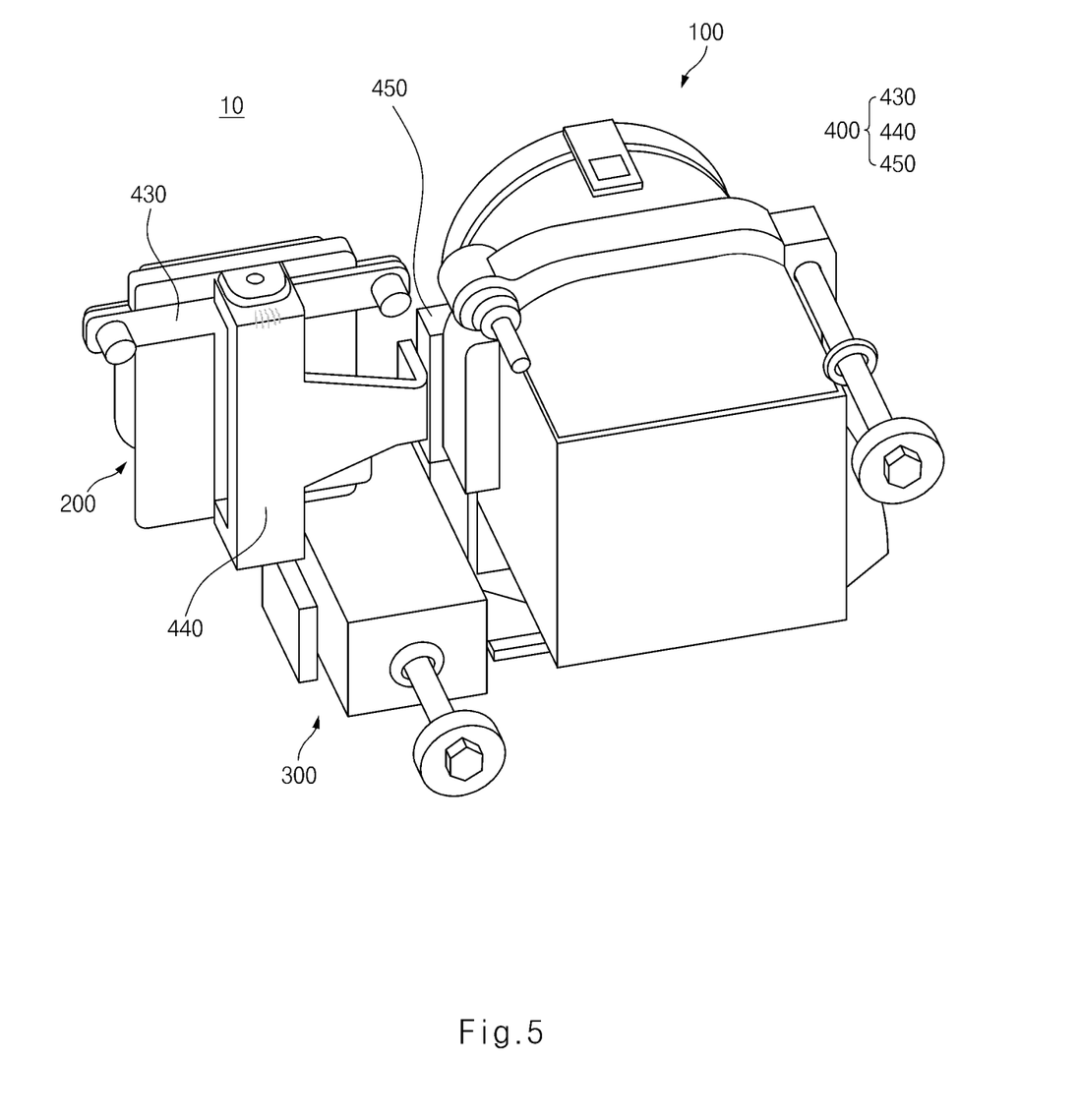
FIG. 5 is a rear view illustrating the structure of a vehicle lamp module, according to another embodiment of the present disclosure.
Figure 6:
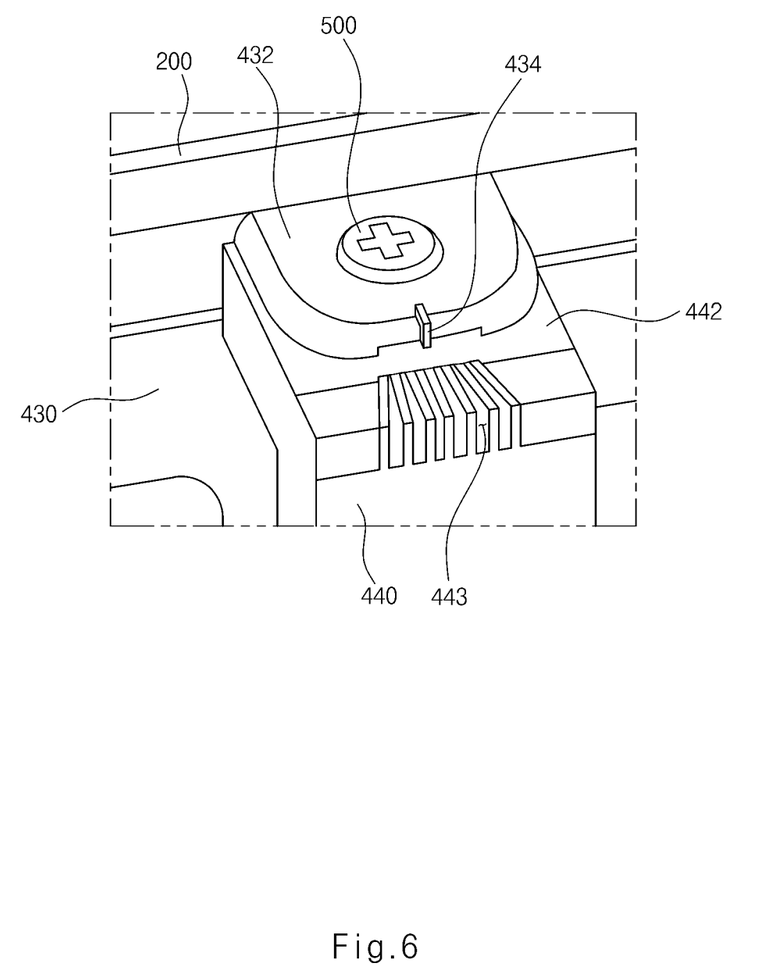
FIG. 6 is an exploded view illustrating the coupling structure between a first base structure and a second base structure in a vehicle lamp module, according to another embodiment of the present disclosure.
Figure 7:
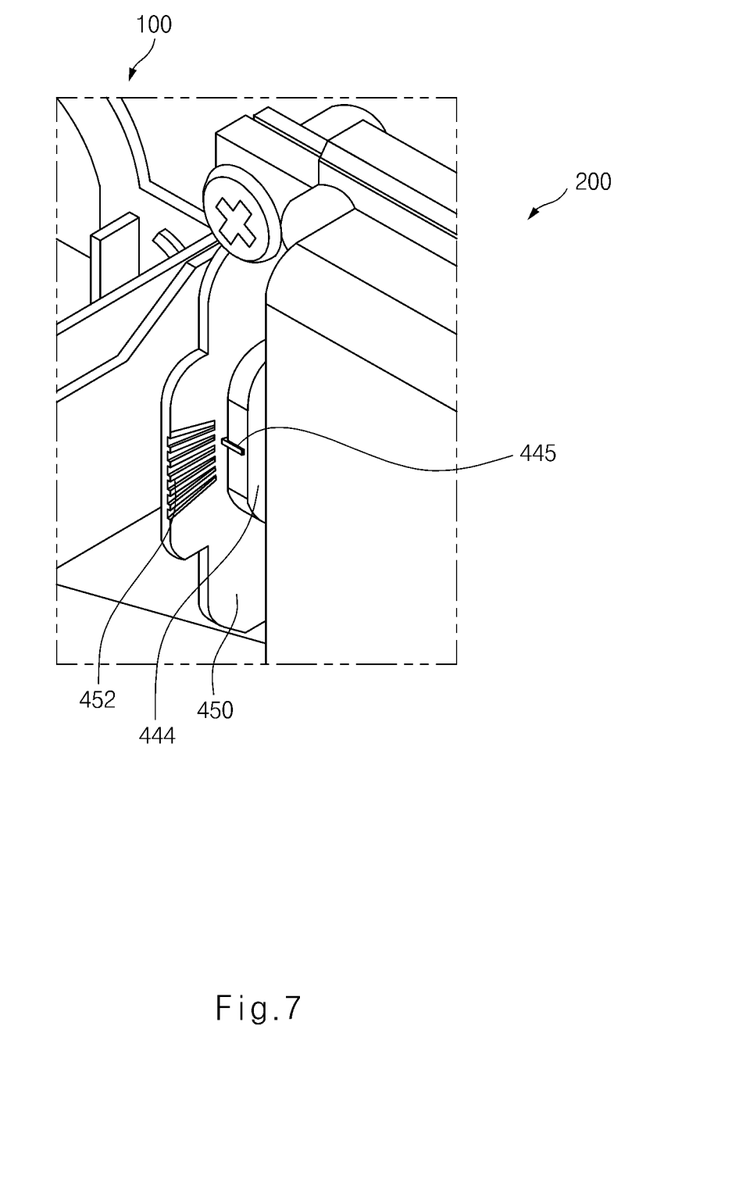
FIG. 7 is an exploded view illustrating the coupling structure between a second base structure and a third base structure in a vehicle lamp module, according to another embodiment of the present disclosure.

FIG. 5 is a rear view illustrating the structure of a vehicle lamp module, according to another embodiment of the present disclosure, FIG. 6 is an exploded view illustrating the coupling structure between a first base structure and a second base structure in a vehicle lamp module, according to another embodiment of the present disclosure, and FIG. 7 is an exploded view illustrating the coupling structure between a second base structure and a third base structure in a vehicle lamp module, according to another embodiment of the present disclosure.

According to another embodiment of the present disclosure, the lamp module 10 may include the beam pattern forming part 100, the sensor part 200, and the driving part 300, which are similar to those of an embodiment of the present disclosure. The details of the beam pattern forming part 100, the sensor part 200, and the driving part 300 may be understood by those skilled in the art by referring to the above descriptions of the beam pattern forming part 100, the sensor part 200, and the driving part 300, and will be omitted below.

Referring to FIG. 5, according to another embodiment of the present disclosure, the lamp module 10 may include a connection part 400 interposed between the beam pattern forming part 100 and the sensor part 200 to connect the beam pattern forming part 100 with the sensor part 200. However, according to another embodiment of the present disclosure, the structure of the connection part 400 may differ from the structure of the connection part described according to an embodiment of the present disclosure.

In more detail, according to another embodiment of the present disclosure, the connection part 400 may include a first base structure 430 fixed to one side of the sensor part 200. More preferably, the first base structure 430 may be fixed to be prevented from moving relatively to the sensor part 200. As illustrated in FIG. 5, the first base structure 430 is fixed to the rear surface of the sensor part 200.

In addition, the connection part 400 may further include a second base structure 440 coupled to one side of the first base structure 430. In this case, according to another embodiment of the present disclosure, the first base structure 430 and the second base structure 440 may be coupled to each other to be rotatable relatively to each other. In more detail, the first base structure 430 and the second base structure 440 may be coupled to each other to be movable relatively to each other in the left-right or lateral direction. Therefore, according to another embodiment of the present disclosure, an angle that the beam pattern forming part 100 faces to the outside and an angle that the sensor part 200 faces the outside may be independently controlled in the left-right or lateral direction, due to the relative rotation between the first base structure 430 and the second base structure 440 in the left-right or lateral direction.

Referring to back to FIG. 5, the connection part 400 may further include a third base structure 450 fixed to one side of the beam pattern forming part 100. More preferably, the third base structure 450 may be fixed to be prevented from moving relatively to the beam pattern forming part 100. As illustrated in FIG. 5, the third base structure 450 is fixed to a side surface, which faces the sensor part 200 of the beam pattern forming part 100. In this case, according to another embodiment of the present disclosure, the second base structure 440 and the third base structure 450 may be coupled to each other to be rotatable relatively to each other. In more detail, the second base structure 440 and the third base structure 450 may be coupled to each other to be rotatable relatively to each other in the up-down or vertical direction. Therefore, according to another embodiment of the present disclosure, the angle that the beam pattern forming part 100 faces to the outside and the angle that the sensor part 200 faces the outside may be independently controlled in the up-down or vertical direction, due to the relative rotation between the second base structure 440 and the third base structure 450 in the up-down or vertical direction. Hereinafter, the first to third base structures will be described in more detail.

As illustrated in FIG. 6, the first base structure 430 may include a first plate member 432 having the shape of a plate extending in a horizontal direction from the sensor part 200. The second base structure 440 may include a second plate member 442 having the shape of a plate provided to face the first plate member 432 and extending in the horizontal direction. FIG. 6 illustrates that the first plate member 432 is provided on the second plate member 442.

In this case, according to another embodiment of the present disclosure, the first plate member 432 and the second plate member 442 may be coupled to each other by a bolt member 500 extending in the up-down or vertical direction.

Therefore, according to another embodiment of the present disclosure, the first plate member 432 and the second plate member 442 may perform rotation movement relatively to each other in the horizontal direction. Therefore, the angle that the beam pattern forming part 100 faces to the outside and the angle that the sensor part 200 faces the outside may be independently controlled in the left-right or lateral direction. Meanwhile, although FIGS. 5 and 6 illustrate that the first plate member 432 and the second plate member 442 are provided at upper ends of the first base structure 430 and the second base structure 440, respectively, the first plate member 432 and the second plate member 442 may be provided at lower ends of the first base structure 430 and the second base structure 440.

Meanwhile, as illustrated in FIG. 7, the third base structure 450 may have the shape of a plate extending in the up-down or vertical direction. In addition, the second base structure 440 may include a third plate member 444 provided to face the third base structure 450 and extending in the up-down or vertical direction.

In this case, according to another embodiment of the present disclosure, the third base structure 450 and the third plate member 444 may be coupled to each other a bolt member (not illustrated) extending in the left-right or lateral direction. Therefore, according to another embodiment of the present disclosure, the third base structure 450 and the third plate member 444 may perform rotation movement relatively to each other in the up-down or vertical direction. Therefore, the angle that the beam pattern forming part 100 faces to the outside and the angle that the sensor part 200 faces the outside may be independently controlled in the up-down or vertical direction.

Meanwhile, according to another embodiment of the present disclosure, the lamp module 10 may further include a component to easily and visibly determine the relative rotation angle between the first plate member 432 and the second plate member 442.

In more detail, referring to FIG. 6, at least one first protruding part 434 may be provided in the form of protruding from a rear surface of the first plate member 432, and at least one first recess part 443 may be provided, in the form of being recessed toward the first protruding part 434, in a region, which faces the first protruding part 434 of the second plate member 442. Therefore, according to another embodiment of the present disclosure, the relative position between the first protruding part 434 and the first recess part 443 is visibly recognized, thereby easily determining the relative difference between the angle that the beam pattern forming part 100 faces the outside and the angle that the sensor part 200 faces the outside, in the horizontal direction. More preferably, one first protruding part 434 may be provided, and a plurality of first recess parts 443 may be provided.

Meanwhile, referring to FIG. 7, at least one first groove part 452 may be provided in a front surface of the third base structure 450, and at least one second protruding part 445 may be provided, in the form of protruding toward the first groove part 452, in a region, which faces the first groove part 452 of the third plate member 444. Therefore, according to another embodiment of the present disclosure, the relative position between the second protruding part 445 and the first groove part 452 is visibly recognized, thereby easily determining the relative difference between the angle that the beam pattern forming part 100 faces the outside and the angle that the sensor part 200 faces the outside, in the up-down or vertical direction. More preferably, a plurality of first groove parts 452 may be provided, and one second protruding part 445 may be provided.

Vehicle

Referring to FIGS. 1 to 7, a vehicle according to the present disclosure may include the vehicle lamp module 10. The description of the vehicle lamp module 10 may be understood by those skilled in the art by referring to the above description. For example, the vehicle lamp module 10 may be provided at a front portion of the vehicle.

Figure 8:
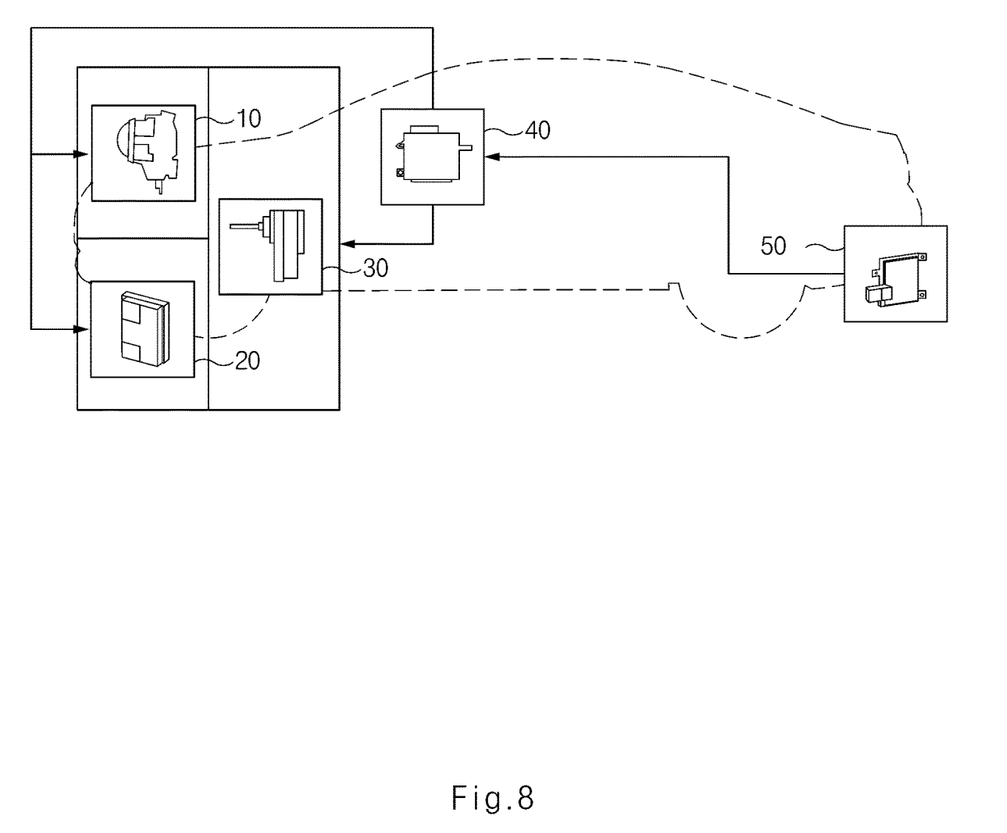
FIG. 8 is a view illustrating the configuration of a head lamp leveling system employing a vehicle lamp module, according to an embodiment of the present disclosure.

FIG. 8 is a view illustrating the configuration of a head lamp leveling system employing a vehicle lamp module, according to an embodiment of the present disclosure.

Referring to FIG. 8, a head lamp leveling system employing a lamp module according to an embodiment of the present disclosure may include the lamp module including a head lamp 10 and a first radar (first distance sensor) 20, a leveling actuator 30, a head lamp leveling controller 40, and a second radar (second distance sensor) 50.

In this case, according to an embodiment of the present disclosure, although the head lamp leveling system including the first distance sensor 20, which is disposed at a front portion of the vehicle, and the second distance sensor 50, which is disposed at a rear portion of the vehicle, in which the first distance sensor 20 and the second distance sensor 50 are employed as examples of radars, at least one distance sensor may be disposed in at least one of the front portion and the rear portion of the vehicle.

In addition, the head lamp 10 and the first radar 20 serving as a sensor part, which are illustrated in FIG. 8, may be included in one lamp module, as described with reference to FIGS. 1 to 7.

The first and second distance sensors 20 and 50 may include sensors, such as a RADAR, a LIDAR, and an infrared sensor, to sense a distance.

The following description will be made regarding the first distance sensor 20 and the second distance sensor 50 including the first radar 20 and the second radar 50, respectively, and the present disclosure is not limited thereto.

The head lamp 10 may include a lamp to lighten a front portion of a vehicle such that the vehicle is safely driving in the light.

The first radar 20 may be disposed at the front portion of the vehicle to emit an electromagnetic wave forward of the vehicle and to receive an electromagnetic wave reflected from an object, thereby sensing the object in front of the vehicle, and determining the distance between the vehicle and the object and the position of the object.

The leveling actuator 30 may be a device to mechanically adjust an angle (light irradiation angle) that the head lamp 10 irradiates light.

A head lamp leveling controller 40 receives detection information from at least one radar among the first radar 20 and the second radar 50, and controls the leveling actuator 30 based on the detection information, thereby adjusting the light irradiation angle of the head lamp.

The second radar 50 is disposed at the rear portion of the vehicle to emit an electromagnetic wave rearward of the vehicle, and to receive an electromagnetic wave reflected from an object, thereby sensing the object in back of the vehicle, and determining the distance between the vehicle and the object, and the position of the object.

According to an embodiment of the present disclosure, the head lamp leveling system emits electromagnetic waves to the ground surface at a specific angle through the first radar 20 and the second radar 50 and receives electromagnetic waves from the ground surface to measure the a distance between the first radar 10 and the ground surface, and a distance between the second radar 50 and the ground surface, and to provide information on the measured distances to the head lamp leveling controller 40.

According to an embodiment of the present disclosure, the head lamp leveling system receives an electromagnetic wave emitted from a radar to the ground surface and reflected from the ground surface to calculate the distance between the radar and the ground surface, thereby calculating a pitching angle between the vehicle and the ground surface and performing an operation (head lamp leveling operation) of leveling the head lamp based on the calculated value.

Figure 9:
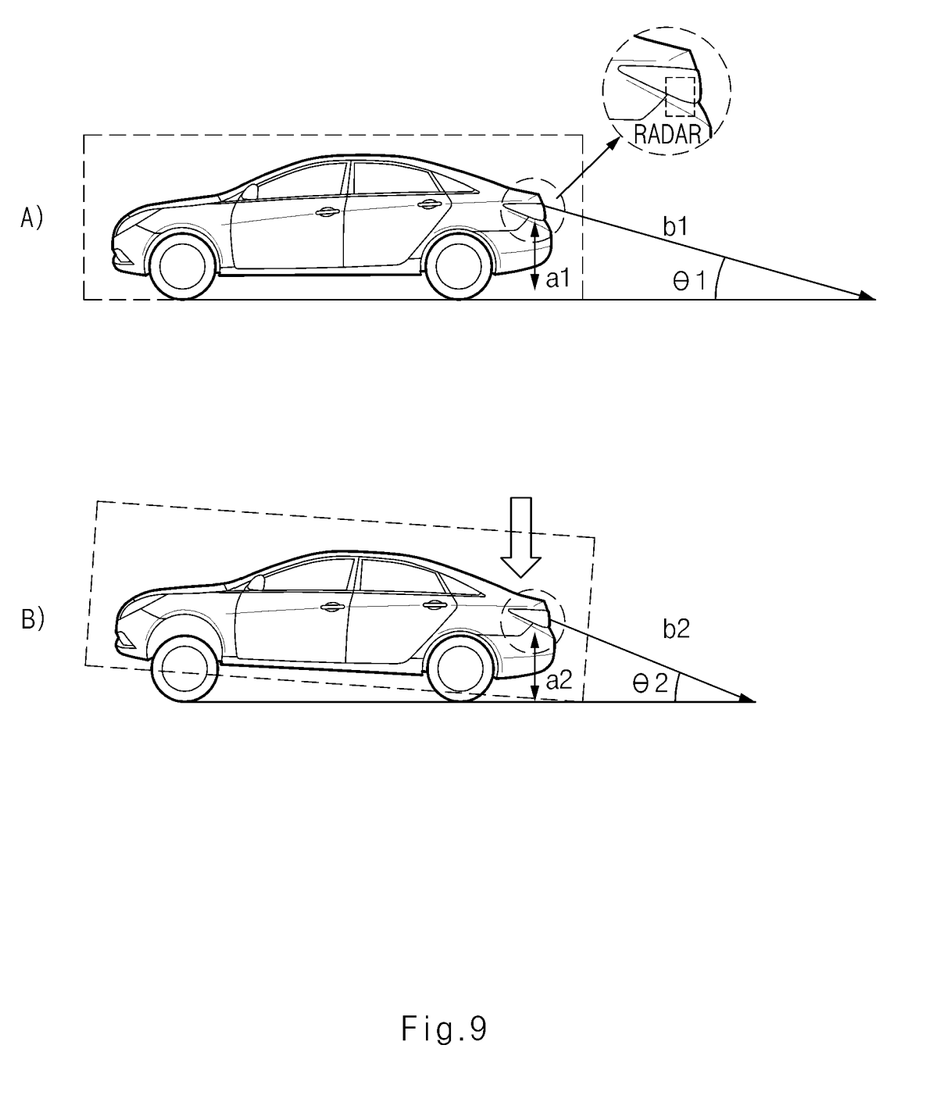
FIGS. 9 to 11 are views illustrating the operation of a head lamp leveling system employing a vehicle lamp module, according to an embodiment.
Figure 10:
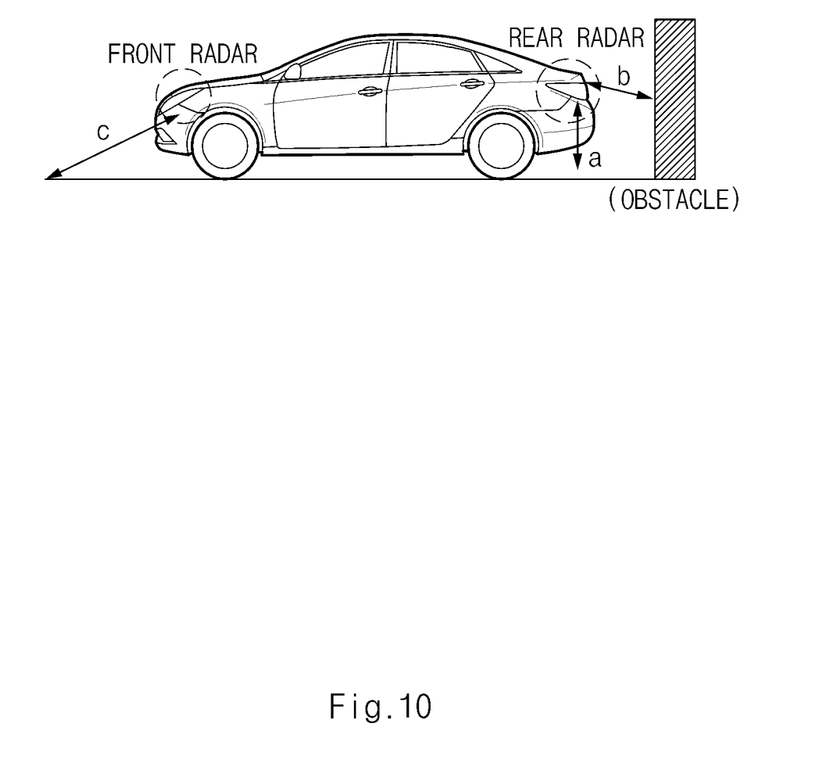
Figure 11:
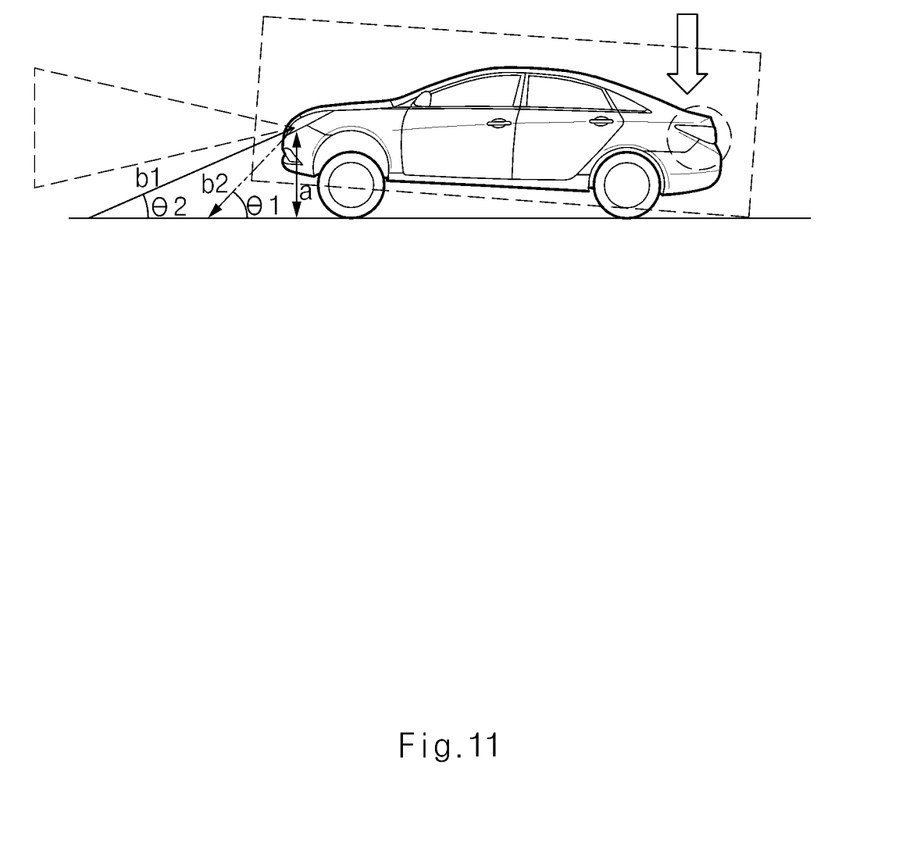

FIGS. 9 to 11 are views illustrating the operations of the head lamp leveling system, according to an embodiment of the present disclosure.

FIG. 9 is a view illustrating the operation of calculating an angle formed between a vehicle body and the ground surface through only the second radar 50 disposed at the rear portion of the vehicle.

Reference sign "A)" of FIG. 9 illustrates that the vehicle body of the vehicle and the ground surface are on the same level, in which an electromagnetic wave emitted from the second radar 50 at a specific angle is reflected from the ground surface and received.

In this case, "a1" indicates the height of the vehicle having the second radar 50, "b1" indicates the distance between the second radar 50 and the ground surface, and "θ°1" indicates an angle between the electromagnetic wave, which is emitted from the second radar 50, and the ground surface.

The height "a1" of the vehicle having the second radar 50 may be a constant value which is set for the head lamp leveling controller 40.

Accordingly, the angle value of "θ1" may be calculated through $\sin \theta 1 = a1/b1$.

The reference sign "B)" of FIG. 9 illustrates that the vehicle body of the vehicle is not on the same level as that of the ground surface, in which an electromagnetic wave emitted from the second radar 50 at a specific angle is reflected from the ground surface and received, when the height of the front portion of the vehicle is higher than the height of the rear portion of the vehicle.

In this case, "a2" indicates the height of the vehicle having the second radar 50, "b2" indicates the distance between the second radar 50 and the ground surface, and "θ2" indicates an angle between the electromagnetic wave, which is emitted from the second radar 50, and the ground surface.

The height "a2" of the vehicle having the second radar 50 may be a constant value which is set for the head lamp leveling controller 40 and equal to the value of "a1" illustrated in reference sign "A)" of FIG. 9.

Accordingly, the angle value of "θ2" may be calculated through $\sin \theta 2 = a2 (=a1)/b2$.

In addition, the difference between "θ1" and "θ2" may be a value corresponding to an angle that the vehicle body of the vehicle is tilted with respect to the ground surface.

For example, as illustrated in FIG. 9, the value of "θ1" may be greater than the value of "θ2", which refers to that the height of the front portion of the vehicle is greater than the height of the rear portion of the vehicle. Accordingly, the head lamp leveling controller 40 may reduce a light irradiation angle of the head lamp 10 by the value corresponding to the difference between the value of "θ1" and the value of "θ2".

To the contrary, the value of "θ1" may be less than the value of "θ2", which refers to that the height of the front portion of the vehicle is less than the height of the rear portion of the vehicle. Accordingly, the head lamp leveling controller 40 may increase a light irradiation angle of the head lamp 10 by the value corresponding to the difference between the value of "θ1" and the value of "θ2".

According to an embodiment of the present disclosure, the head lamp leveling controller 40 included in the head lamp leveling system of the vehicle may calculate the change in height between the front portion and the rear portion of the vehicle, based on the sensing result from the second radar 50 disposed at the rear portion of the vehicle, such that the calculation result is used to adjust the light irradiation angle of the head lamp 10.

In other words, the head lamp leveling system of the vehicle may calculate the change in height (for example, the change in vehicle height) between the front portion and the rear portion of the vehicle, based on the sensing result of a radar disposed at the rear portion of the vehicle, thereby adjusting the light irradiation angle of the head lamp disposed at the front portion of the vehicle.

FIG. 10 is a view illustrating the operation of a head lamp leveling system of a vehicle, when an obstacle is present in back of the vehicle, according to an embodiment of the present disclosure.

FIG. 10 may illustrate the case that an obstacle is present in back of a vehicle, in more detail, the case in which the obstacle is closer to the vehicle to the extent that the vehicle receives an electromagnetic wave that is emitted from the second radar 50, which is disposed at the rear portion of the vehicle, and reflected from the obstacle.

As described above with reference to FIG. 9, according to an embodiment of the present disclosure, the head lamp leveling system may adjust the light irradiation angle of the head lamp 10 by determining the tilting degree between the vehicle body of the vehicle and the ground surface based on the sensing result from the second radar 50 disposed at the rear portion of the vehicle. However, as illustrated in FIG. 10, an erroneous operation may be caused to make a determination that the vehicle body of the vehicle is not on the same level as that of the ground surface, even though the vehicle body of the vehicle is on the same as that of the ground surface.

In this case, the change in height of the front portion of the vehicle may be determined based on the sensing result received from the first radar 20 disposed at the front portion of the vehicle, that is, based on the electronic wave emitted at a specific angle from the first radar 20 and reflected from the ground surface.

When there is no change in the result obtained by measuring a distance "C" between the first radar 20 and the ground surface, based on the electromagnetic wave emitted at a specific angle from the first radar 20 and reflected from the ground surface, the erroneous operation may be determined as being caused by the obstacle in back of the vehicle, and the vehicle body of the vehicle may be determined as being on the same as that of the ground surface.

In other words, according to another embodiment, the head lamp leveling controller 40 of the head lamp leveling system may calculate the angle between the vehicle body of the vehicle and the ground surface, based on the sensing result from the second radar 50, and may verify the angle calculated based on the sensing result from the first radar 20.

Accordingly, the head lamp leveling controller 40 of the head lamp leveling system according to an embodiment of the present disclosure may perform a head lamp leveling operation corresponding to an angle which is not determined as an error, and may not perform the head lamp leveling operation (an operation of changing the light irradiation angle of the head lamp) when the erroneous operation is not determined as being caused.

Therefore, according to an embodiment of the present disclosure, the head lamp leveling system may calculate the angle between the vehicle body of the vehicle and the ground surface by using a radar disposed at the rear portion of the vehicle, and verify the calculated angle between the vehicle body and the ground surface by using a radar disposed at the front portion of the vehicle, such that the head lamp leveling system may block an error in the head lamp leveling operation.

FIG. 11 is a view illustrating the operation of calculating the angle between the vehicle body of the vehicle and the ground surface by using a radar disposed at a front portion of the vehicle.

In FIG. 11, "a" may indicate the height of the vehicle having the first radar 20 disposed at the front portion of the vehicle, "b1" and "b2" may indicate distances to the ground surface, which are measured by the first radar 20, and "θ1" and "θ2" may be angles between electromagnetic waves emitted from the first radar 20 and the ground surface.

In this case, "b1" may indicate the distance to the ground surface measured by the first radar 20 before the vehicle body is tilted, and "b2" is the distance to the ground surface measured by the first radar 20 after the vehicle body is tilted.

Accordingly, "θ1" is the angle between the electromagnetic wave emitted from the first radar 20 and the ground surface before the vehicle body is tilted, and "θ2" is the angle between the electromagnetic wave emitted from the first radar 20 and the ground surface after the vehicle body of the vehicle is tilted.

The height "a" of the first radar 20 disposed at the front portion of the vehicle may be a constant value and stored in the head lamp leveling controller 40.

The head lamp leveling controller 40 may calculate "θ1" and "θ2", based on the stored height "a" of the first radar 20 and the distances "b1" and "b2" measured by the first radar 20, through the equation of $\sin \theta = a/b$, and may calculate the angle between the vehicle body of the vehicle and the ground surface by calculating the difference between "θ1" and "θ2".

The head lamp leveling controller 40 may control the light irradiation angle of the head lamp 10, based on the calculated angle between the vehicle body of the vehicle and the ground surface.

In addition, when the obstacle is present in front of the vehicle, the angle between the vehicle body of the vehicle and the ground surface, which is calculated based on the sensing result from the first radar 20, may be verified by using the second radar 50 disposed at the rear portion of the vehicle.

In addition, the head lamp leveling system according to an embodiment of the present disclosure may reduce an angle that the first radar 20 disposed at the front portion of the vehicle emits the electromagnetic wave, together with the light irradiation angle of the head lamp 10 when the vehicle is parted.

Therefore, according to an embodiment of the present disclosure, the head lamp leveling system may adjust the light irradiation angle of the head lamp only through an advanced driver assistance systems (ADAS) or a radar used in autonomous driving, without a sensor to sense the height of the vehicle body of the vehicle. Accordingly, the costs may be reduced, and the vehicle system may be reduced.

According to the present disclosure, there may be provided a vehicle lamp module having the structure of automatically adjusting the direction of the sensor, as well as the lamp for a vehicle, depending on the position change of the vehicle.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle lamp module comprising:
a beam pattern forming part configured to form a beam pattern of light irradiated externally from a vehicle;
a sensor part positioned adjacent to the beam pattern forming part and configured to sense an external region of the vehicle including the beam pattern of the externally irradiated light;
a driving part coupled to the sensor part and configured to provide a driving force for rotating the sensor part to face a different part of the external region; and
a connection part positioned between the beam pattern forming part and the sensor part and configured to selectively connect the beam pattern forming part to the sensor part,
wherein, when the beam pattern forming part is connected to the sensor part, the beam pattern forming part is configured to rotate together with the sensor part.

2. The vehicle lamp module of claim 1, wherein:
the sensor part is configured to rotate vertically when the driving force is applied thereto by the driving part, and
the beam pattern forming part is configured to rotate vertically with the sensor part when the connection part connects the beam pattern forming part to the sensor part.

3. The vehicle lamp module of claim 2, wherein:
the sensor part is provided at a lateral side of the beam pattern forming part, and
the driving part is provided at a vertical side of the sensor part.

4. The vehicle lamp module of claim 3, wherein the driving part is positioned below the sensor part.

5. The vehicle lamp module of claim 1, wherein:
the connection part includes:
a first connection member coupled to the beam pattern forming part; and
a second connection member coupled to the sensor part, and
the beam pattern forming part is connected to the sensor part when the first connection member and the second connection member move laterally toward each other.

6. The vehicle lamp module of claim 5, wherein:
the first connection member comprises a rod structure configured to move laterally,
the connection part connects the beam pattern forming part to the sensor part when the rod structure moves laterally and is inserted into the second connection member, and
the connection part disconnects the beam pattern forming part from the sensor part when the rod structure moves laterally and is separated from the second connection member.

7. The vehicle lamp module of claim 6, wherein:
the second connection member further comprises a support structure provided at a rear portion of the sensor part, the support structure having a plate shape and having a portion facing the rod structure and having a hole,
the connection part connects the beam pattern forming part to the sensor part when the rod structure moves laterally and is inserted into the hole, and
the connection part disconnects the beam pattern forming part from the sensor part when the rod structure moves laterally and is separated from the hole.

8. A vehicle lamp module comprising:
a beam pattern forming part configured to form a beam pattern of light irradiated externally from a vehicle;
a sensor part positioned adjacent to the beam pattern forming part and configured to sense an external region of the vehicle including the beam pattern of the externally irradiated light;
a driving part coupled to the sensor part and configured to provide a driving force for rotating the sensor part to face a different part of the external region; and
a connection part positioned between the beam pattern forming part and the sensor part and configured to connect the beam pattern forming part to the sensor part,
wherein the connection part includes:
a first base structure connected to the sensor part; and
a second base structure connected to the first base structure, and
wherein the first base structure and the second base structure are coupled to each other and configured to be rotatable.

9. The vehicle lamp module of claim 8, wherein the first base structure and the second base structure are configured to be horizontally rotatable.

10. The vehicle lamp module of claim 9, wherein:
the connection part further includes a third base structure connected to the beam pattern forming part, and
the second base structure and the third base structure are coupled to each other and configured to be rotatable.

11. The vehicle lamp module of claim 10, wherein the second base structure and the third base structure are configured to be vertically rotatable.

12. The vehicle lamp module of claim 11, wherein:
the third base structure has a plate shape extending vertically,
the second base structure includes a third plate member positioned to face the third base structure and extending vertically, and
the third base structure and the third plate member are coupled to each other by a bolt extending horizontally.

13. The vehicle lamp module of claim 12, further comprising:
a first groove part positioned in a front of the third base structure, and
a second protruding part positioned in a region of the third plate member facing the first groove part.

14. The vehicle lamp module of claim 9, wherein:
the first base structure includes a first plate member extending horizontally from the sensor part,
the second base structure includes a second plate member positioned to face the first plate member and extending horizontally, and
the connection part further comprises a bolt member extending vertically and configured to couple the first and second plate members.

15. The vehicle lamp module of claim 14, further comprising:

a first protruding part extending from a rear surface of the first plate member; and a first recess part located in a region of the second plate member facing the first protruding part.

16. The vehicle lamp module of claim 15, wherein:

the first protruding part comprises a single protruding part, and the first recess part comprises a plurality of recess parts.

17. A vehicle lamp module leveling system comprising:

a vehicle lamp module comprising:
- a beam pattern forming part configured to form a beam pattern of light irradiated externally from a vehicle;
- a sensor part positioned adjacent to the beam pattern forming part and configured to sense an external region of the vehicle including the beam pattern of the externally irradiated light, when the beam pattern forming part is connected to and configured to rotate with the sensor part;
- a driving part coupled to the sensor part and configured to provide a driving force for rotating the sensor part to face a different part of the external region; and
- a connection part positioned between the beam pattern forming part and the sensor part and configured to selectively connect the beam pattern forming part to the sensor part;

a distance sensor positioned adjacent to a front or rear portion of a vehicle; and a vehicle lamp module leveling controller configured to:
- calculate, based on a sensing result from the distance sensor, an angle between a vehicle body of the vehicle and a ground surface; and
- control, based on the calculated angle, an irradiation angle of the vehicle lamp module.

18. The vehicle lamp module leveling system of claim 17, wherein the vehicle lamp module leveling controller is configured to:
- calculate, based on a height of the distance sensor and the sensing result from the distance sensor, the angle between the vehicle body and the ground surface; and
- change, based on the calculated angle, the irradiation angle of the vehicle lamp module.

19. The vehicle lamp module leveling system of claim 18, wherein:

the sensing result includes first and second sensing results provided from the distance sensor at first and second times, respectively, and the vehicle lamp module leveling controller is further configured to change the irradiation angle of the vehicle lamp module based on a difference between (1) a first angle between the vehicle body and the ground surface calculated based on the first sensing result, and (2) a second angle between the vehicle body and the ground surface calculated based on the second sensing result.

20. The vehicle lamp module leveling system of claim 17, wherein:

the distance sensor comprises a plurality of distance sensors, and the vehicle lamp module leveling controller is further configured to:
- change, based on a change to the sensing result from some of the plurality of distance sensors, the irradiation angle of the vehicle lamp module, and
- block any change to the irradiation angle of the vehicle lamp module when there is no change to the sensing result from the rest of the plurality of sensing results.

* * * * *